United States Patent [11] 3,612,782

| [72] | Inventor | George Wilfred Gilbert |
|---|---|---|
| | | Winston-Salem, N.C. |
| [21] | Appl. No. | 15,519 |
| [22] | Filed | Mar. 2, 1970 |
| [45] | Patented | Oct. 12, 1971 |
| [73] | Assignee | Bell Telephone Laboratories, Incorporated |
| | | Murray Hill, Berkeley Heights, N.J. |

[54] METHOD AND APPARATUS FOR DETECTING THE LOCATION OF A FAULT BETWEEN TWO REPEATERS OF A ONE-WAY REPEATERED TRANSMISSION LINE
12 Claims, 1 Drawing Fig.

[52] U.S. Cl. .................................................... 179/175.3,
179/175.31 R, 324/52
[51] Int. Cl. .................................................... H04b 3/46
[50] Field of Search .......................................... 179/175.31
R, 175.3; 324/52

[56] References Cited
UNITED STATES PATENTS
3,311,714  3/1967  Howsan ........................ 179/175.31

Primary Examiner—Kathleen H. Claffy
Assistant Examiner—Douglas W. Olms
Attorneys—R. J. Guenther and William L. Keefauver ABSTRACT: Noise generated at the input of a one-way repeater is reflected by a fault in a line segment connected to the input terminals of that repeater. Double spectrum analysis of the repeater output (which is part of the output of a receiving station when the repeater and line segment are a part of a one-way repeatered transmission line) recovers information relating to the distance of the fault from the repeater.

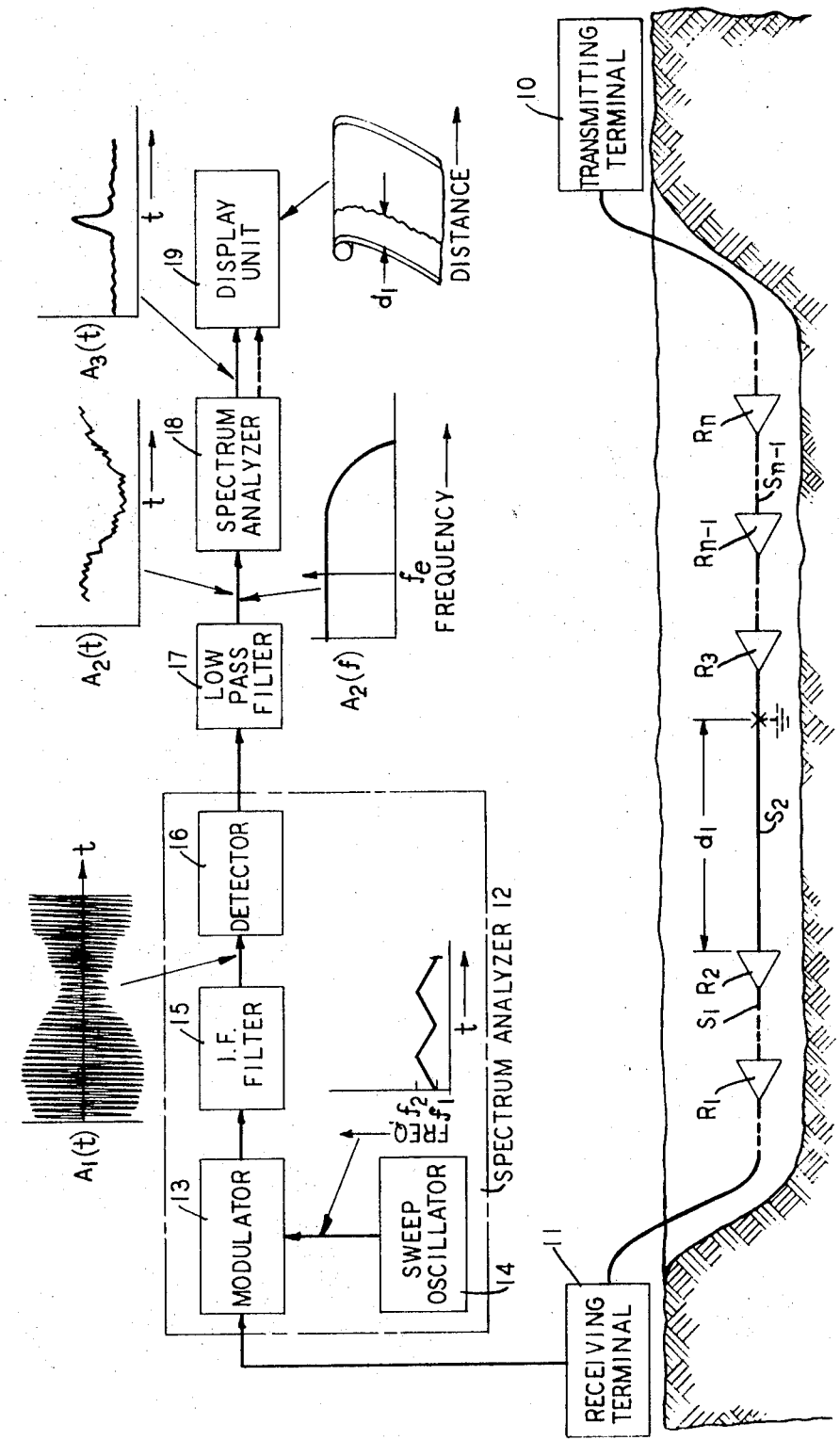

3,612,782

METHOD AND APPARATUS FOR DETECTING THE LOCATION OF A FAULT BETWEEN TWO REPEATERS OF A ONE-WAY REPEATERED TRANSMISSION LINE

GOVERNMENT CONTRACT

The invention herein claimed was made in the course of or under a contract with the Department of the Navy.

BACKGROUND OF THE INVENTION

1. Field of the Invention

This invention relates to locating faults in transmission lines.

2. Description of the Prior Art

U.S. Pat. No. 1,392,815 issued to G. Crisson on Oct. 4, 1921 discloses a technique for locating irregularities or faults in two-way transmission lines. In particular, Crisson relies upon a fault in a two-way transmission line to produce a standing wave so that he may determine the fault location from the following expression:

$S=(V/2\Delta f)$, (1) where $\Delta f$ is the frequency change of an applied signal to produce successive maximum or minimum values of the standing wave as measured at the point of application, S is the distance from the point of application to the fault and V is the velocity of propagation in the line. It is believed apparent, however, that this technique will not function for unidirectional, or one-way, transmission lines. It will not function, for example, from a shore station for locating a fault between repeaters of a one-way repeatered submarine cable.

To applicant's knowledge, a technique for determining the distance to a fault in a one-way repeatered line is not available. The nearest approach appears to involve techniques which identify the specific repeaters between which the fault exists (see, for example, U.S. Pat. No. 3,325,605 issued to S. T. Brewer on June 13, 1967). These techniques, however, do not measure the distance of the fault from these repeaters. This leaves much to be desired in such cases as underwater cables where the distance between repeaters is in the order of 20 miles.

SUMMARY OF THE INVENTION

An object of the invention is to locate a fault with respect to an adjacent repeater in a one-way repeatered transmission line without requiring direct access to the line segment containing the fault.

This and other objects are achieved in accordance with the invention by analyzing the output from a receiving station connected to a faulted one-way transmission line. In general, this output results from noise generated by repeaters and line segments between the fault and the receiving end of the line and also by the receiving station. Although this output appears to be random noise and in fact consists primarily of random noise, it nevertheless includes a nonrandom portion. This nonrandom portion is produced as a result of noise reflections produced by an impedance mismatch introduced by the fault. In particular, noise emanating from the input terminals of the repeater connected to the line segment containing the fault is transmitted down the line segment to the fault where it is reflected back to the repeater input terminals as a result of impedance mismatch produced by the fault. The reflected noise algebraically combines with noise from the repeater and although the combination still appears to be noise, it nevertheless contains information related to the distance of the fault from the repeater. This information-containing combination is transmitted with random noise generated by subsequent repeaters and line segments to the receiving station.

In accordance with the invention, the output from a receiving station connected to a faulted one-way transmission line is first spectrum analyzed to produce an output having a direct current component, a periodic component and a noise component. The noise component may then be suppressed to the point short of adversely affecting the periodic component. The remaining output is in turn spectrum analyzed to produce an output which peaks as a function of time, where time is related to the frequency being analyzed and the peak occurs at a time corresponding to the frequency of the periodic component produced by the first spectrum analysis. As the frequencies of such components are directly related to the distances of the faults from the input terminals of repeaters connected to line segments containing the faults, this last output may be conveniently displayed on a time basis where the time axis is calibrated in feet or some other linear measurement. Distances from faults to repeaters having their inputs connected to the line segments containing the faults are therefore directly indicated.

Other objects and features of the invention will become apparent from a study of the following detailed description of apparatus embodying the invention.

BRIEF DESCRIPTION OF THE DRAWING

The drawing discloses noise analyzing apparatus connected to a receiving station of a faulted one-way repeatered underwater transmission line or cable.

DESCRIPTION OF THE DISCLOSED EMBODIMENT

The drawing shows a one-way repeatered underwater transmission line or cable comprising a plurality of one-way repeaters $R_1$ through $R_n$ with interconnecting line segments $S_1$ through $S_{n11}$. The input end to the line is connected to a shore-based transmitting station 10 while the output end of the line is connected to a shore-based receiving station 11. As shown in the drawing, line segment $S_2$ is faulted as a result of grounding or shorting at a distance $d_1$ from the input to repeater $R_2$.

Noise originating between the fault and the output terminals of receiving station 11 combines to form the output of that station. This output, as explained in detail previously, includes a nonrandom portion formed by noise which emanates from the input terminals of repeater $R_2$ and travels to the fault where it is reflected toward receiving station 11. The remaining apparatus, as will now be described in detail, operates on the output of receiving station 11 to detect certain characteristics present therein as a result of the nonrandom portion and to display these characteristics in a manner to indicate the distance $d_1$ to the fault.

The output of receiving station 11 is applied to a spectrum analyzer 12. Although the invention is not limited to a particular type of spectrum analyzer, a particular type has been chosen for purposes of explanation and is illustrated in block diagram in the drawing. In particular it comprises a modulator 13 which modulates the output of station 11 with a varying frequency signal produced by a sweep oscillator 14. As illustrated by the small sketch adjacent to the oscillator output lead, the frequency of the oscillator output changes between frequencies $f_1$ and $f_2$ in a linear manner with respect to time. The output from modulator 13 is passed through an IF filter 15. As a result of modulator 13, sweep oscillator 14 and IF filter 15, a relatively wide frequency band ($f_2$-$f_1$) of the output of station 11 is repetitively swept by a relatively narrow frequency band (IF filter bandpass) to produce an IF output having a time base where each point thereon is related to a particular narrow frequency band portion of the station 11 output. A typical IF output is shown in the sketch next to the output lead of filter 15. The generally periodic envelope of this IF output is produced as a result of the noise reflected by the fault. For purposes of illustration, the clarity of this envelope has been overemphasized; in practice, it is greatly obscured. This output is applied to a detector 16 which produces an output comprising the envelope waveform and a wide band of noise which greatly obscures the envelope waveform. This comprises the output of spectrum analyzer 12.

In order to suppress some of the noise from analyzer 12, the output of analyzer 12 is passed through a low-pass filter 17. The output of filter 17 is shown in the frequency domain by the sketch below the output lead of filter 17 while it is shown in the time domain by the sketch about the output lead. The effect of the reflected noise shows in the time domain sketch by the periodic envelope of the waveform and in the frequency domain sketch by the vertical arrow. The frequency $f_e$ in Hz. of this periodic envelope is:

$$f_e = (2R/c) d_1 \quad (2)$$

where $R$ is the sweep rate of oscillator 14 in Hz. per second and $c$ is the velocity of propagation in the faulted line segment.

If the excess noise is found unobjectionable, filter 17 may of course be eliminated.

The output of filter 17 is applied to a spectrum analyzer 18 which may take the same general form as that shown for analyzer 12. The output of analyzer 18 has a time domain characteristic of the form shown in the sketch associated with its output lead. As shown in the sketch, a peaking occurs at one point in time which is also an indication of the frequency of the envelope because there is a linear relationship between the two produced by the sweep oscillator associated with analyzer 18. The time base may therefore be calibrated in frequency so that the peaking also indicates the frequency of the periodic envelope at the output of filter 17.

The output of analyzer 18 is applied to a display unit 19 which is synchronized (as indicated by the broken interconnecting line) with analyzer 18. Display unit 19 may have a chart display as indicated in the drawing. In the case of a chart display, the chart marking means would be driven across the width of the chart in synchronism with the drive on the sweep oscillator of analyzer 18 while the chart is advanced at a uniform rate. The width of the chart is readily calibrated in distance because, as pointed out above, a linear relationship exists between time and the frequency of the envelope of the output of filter 17 and, furthermore, the expression $$d_1 = (cf_e/2R) \quad (3)$$

follows from expression (2). Display unit 19 is effective, therefore, to convert the output of analyzer 18 into an indication of distance to the fault.

What is claimed is:

1. In combination,
    a one-way repeatered transmission line having input and output ends and comprising a plurality of one-way repeaters with interconnecting line segments,
    first and second spectrum analyzing means,
    display means, and
    means connecting said spectrum analyzing means in series between said output end of said line and said display means.

2. A combination in accordance with claim 1 in which said last means comprises a low-pass filter between said first and second spectrum analyzing means.

3. A combination for locating, with respect to an adjacent repeater, an impedance mismatch-producing fault in a line segment of a one-way repeatered transmission line having input and output ends and comprising a plurality of one-way repeaters with interconnecting line segments, said combination comprising,
    first and second spectrum analyzing means,
    display means, and
    means connecting said first and second analyzing means in tandem between said output end of said line and said display means.

4. A combination in accordance with claim 3 in which said last-mentioned means comprises a low-pass filter between said first and second analyzing means.

5. In combination,
    a one-way repeatered transmission line having input and output ends and comprising a plurality of one-way repeaters interconnected by line segments with one of said line segments having a fault which introduces an impedance discontinuity,
    a receiving station connected to the output end of said line for making available an output representative of the output received from said line,
    a first spectrum analyzer connected to said receiving station to produce an output representative of the spectral analysis of said receiving station output,
    a second spectrum analyzer,
    means connecting said second spectrum analyzer to said first spectrum analyzer to receive at least a portion of said first spectrum analyzer output and to produce an output representative of the spectral analysis thereof,
    a display unit connected to said second analyzer to show said second analyzer output on a display scaled in a linear measurement.

6. A combination in accordance with claim 5 in which said means comprises a low-pass filter.

7. A combination for locating, with respect to an adjacent repeater, an impedance mismatch-producing fault in a line segment of a one-way repeatered transmission line having input and output ends and comprising a plurality of one-way repeaters with interconnecting line segments, said combination comprising
    a receiving station connected to the output end of said line for making available an output representative of the output received from said line,
    a first spectrum analyzer connected to said receiving station to produce an output representative of the spectral analysis of said receiving station output,
    a second spectrum analyzer,
    means connecting said second spectrum analyzer to said first spectrum analyzer to receive at least a portion of said first spectrum analyzer output and to produce an output representative of the spectral analysis thereof, and
    a display unit connected to said second analyzer to show said second analyzer output on a display scaled in a linear measurement.

8. A combination in accordance with claim 7 in which said means comprises a low-pass filter.

9. The method of determining the length of a transmission line segment having one end terminated so as to have an impedance discontinuity and the other end connected to the input terminals of a one-way repeater, which method comprises the steps of
    spectrum analyzing the output from said repeater to produce a first result having a periodic component and a noise component,
    spectrum analyzing at least a portion of said first result to produce a second result identifying the frequency of said periodic component and
    converting said second result into a measure of distance.

10. A method in accordance with claim 9 comprising the further step of suppressing as much of said noise component as possible in said first result without adversely affecting said periodic component.

11. The method of determining the distance of a fault in a transmission line segment from the input terminals of a repeater connected to that line segment wherein the line segment and repeater comprise a part of a one-way repeatered transmission line having its output end connected to a receiving station, which method comprises the steps of
    spectrum analyzing the output of said receiving station to produce a first result having a periodic component and a noise component,
    spectrum analyzing at least a portion of said first result to produce a second result identifying the frequency of said periodic component and
    converting said second result into a measure of distance.

12. A method in accordance with claim 11 comprising the further step of suppressing as much of said noise component as possible in said first result without adversely affecting said periodic component.